United States Patent
Schmidinger et al.

(10) Patent No.: US 9,481,376 B2
(45) Date of Patent: Nov. 1, 2016

(54) EMERGENCY BEARING MECHANISM

(71) Applicant: INNOVA PATENT GMBH, Wolfurt (AT)

(72) Inventors: Klaus Schmidinger, Schwarzenberg (AT); Guenther Primus, Schwarzach (AT)

(73) Assignee: Innova Patent GmbH, Wolfurt (AT)

( * ) Notice: Subject to any disclaimer, the term of this patent is extended or adjusted under 35 U.S.C. 154(b) by 133 days.

(21) Appl. No.: 14/371,800

(22) PCT Filed: Sep. 9, 2013

(86) PCT No.: PCT/AT2013/000145
§ 371 (c)(1),
(2) Date: Jul. 11, 2014

(87) PCT Pub. No.: WO2014/040096
PCT Pub. Date: Mar. 20, 2014

(65) Prior Publication Data
US 2014/0345489 A1 Nov. 27, 2014

(30) Foreign Application Priority Data

Sep. 13, 2012 (AT) .............................. A 1001/2012

(51) Int. Cl.
*B61B 12/02* (2006.01)
*F16C 19/54* (2006.01)
*B61B 7/00* (2006.01)
*F16C 19/52* (2006.01)
*F16C 19/55* (2006.01)
*F16C 17/20* (2006.01)
(Continued)

(52) U.S. Cl.
CPC ................ *B61B 7/00* (2013.01); *F16C 19/52* (2013.01); *F16C 19/54* (2013.01); *F16C 19/55* (2013.01); *F16C 17/20* (2013.01); *F16C 19/28* (2013.01); *F16C 21/00* (2013.01); *F16C 2326/10* (2013.01)

(58) Field of Classification Search
CPC ..... B61B 12/00; B61B 12/007; B61B 12/02; B61B 12/04; B61B 12/06; F16C 19/00; F16C 19/22; F16C 19/24; F16C 19/28; F16C 19/49; F16C 19/492
USPC .............. 104/112, 113, 115–117.1; 384/447, 384/460, 495–498, 461
See application file for complete search history.

(56) References Cited

U.S. PATENT DOCUMENTS

| 3,452,349 A | 6/1969 | Wood |
| 4,664,539 A | 5/1987 | Li |
| 6,445,099 B1 | 9/2002 | Roseman |
| 7,650,842 B2 * | 1/2010 | Reisch ...................... B61B 7/06 104/112 |

(Continued)

FOREIGN PATENT DOCUMENTS

| DE | 102010032110 A1 | 1/2012 |
| FR | 568608 | 3/1924 |

(Continued)

*Primary Examiner* — R. J. McCarry, Jr.
(74) *Attorney, Agent, or Firm* — Laurence A. Greenberg; Werner H. Stemer; Ralph E. Locher

(57) ABSTRACT

In a bearing unit of a cable sheave of a cableway system, the cable sheave is arranged on a shaft which is mounted in bearings in a bearing framework. An inner ring or an outer ring of at least a first bearing is connected to the shaft. The outer ring or the inner ring of the first bearing is connected to an inner ring or an outer ring of a second bearing and is mounted in the bearing framework via the second bearing.

16 Claims, 3 Drawing Sheets

(51) Int. Cl.
  *F16C 21/00* (2006.01)
  *F16C 19/28* (2006.01)

(56) References Cited

U.S. PATENT DOCUMENTS

2003/0123767 A1 7/2003 Fite et al.
2010/0008612 A1* 1/2010 Grehn .................. D21G 1/0226
                                                          384/548
2013/0333588 A1 12/2013 Bacher et al.

FOREIGN PATENT DOCUMENTS

| FR | 2211999 A5 | 7/1974 |
| JP | S52164871 U | 12/1977 |
| JP | S628418 U | 1/1987 |
| SU | 1495921 A1 | 7/1989 |
| WO | 2012080983 A1 | 6/2012 |

* cited by examiner

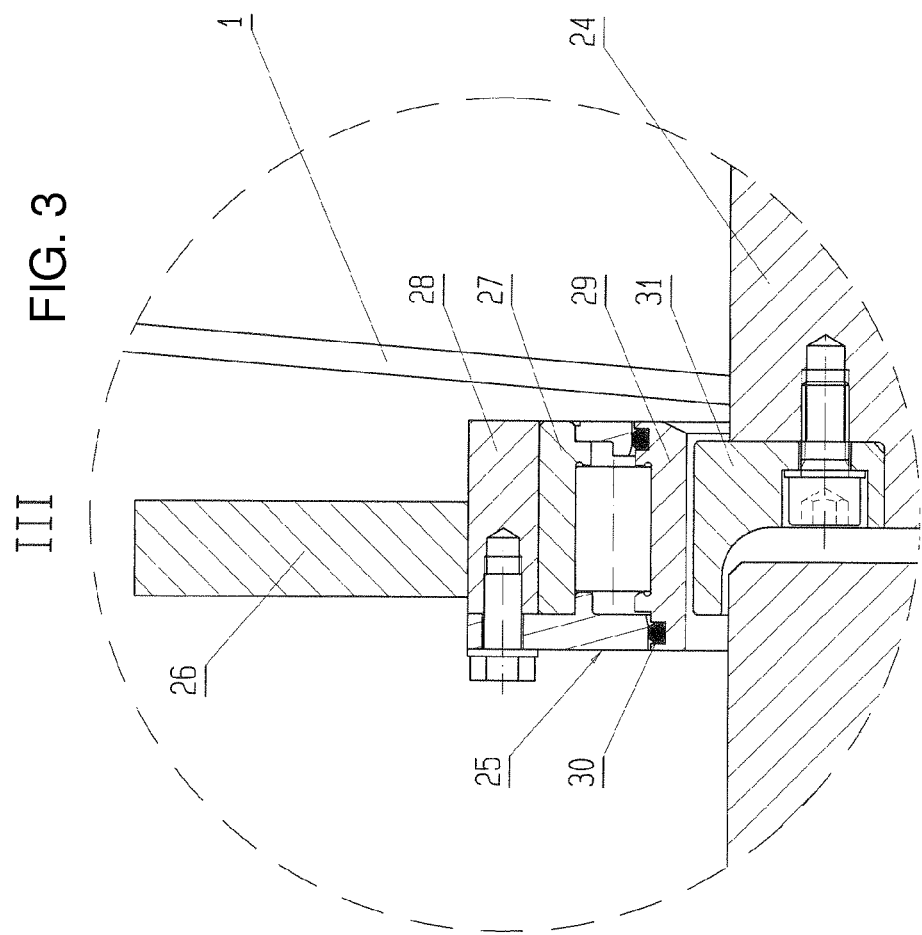

EMERGENCY BEARING MECHANISM

BACKGROUND OF THE INVENTION

Field of the Invention

The invention relates to a bearing unit of a pulley of a cable car, in which bearing unit the pulley is arranged on a shaft which is mounted in bearings in a bearing frame, an inner or outer ring of at least one first bearing being connected to the shaft.

The bearing unit according to the invention can be used not only for pulleys of a cable car but also for pulleys in other fields of use, and likewise for rope sheaves, belt pulleys, chain disks or sprockets or the like. In the following text, however, the invention will be described by way of example in conjunction with a pulley of a cable car.

If, in a cable car, bearing damage occurs in a pulley, the latter should at any rate be capable of still rotating until all passengers in the cars or on the chairs have been conveyed into a station, in which they can then disembark.

BRIEF SUMMARY OF THE INVENTION

The invention is therefore based on the object of providing a bearing unit of a pulley of a cable car, which bearing unit makes further rotation of the pulley possible even in the case of bearing damage.

In a bearing unit of the type mentioned at the outset, this object is achieved by virtue of the fact that the outer or inner ring of said first bearing is connected to an inner or outer ring of a second bearing and is mounted in the bearing frame via said second bearing.

If the first bearing or main bearing is damaged and can no longer be rotated, the pulley can still be rotated via the second bearing which is preferably only a bearing which is designed for emergency operation and is therefore less expensive, until all passengers have been evacuated and possibly all carriers have been withdrawn and any possible other maintenance or repair work has been able to be carried out before the first bearing and at any rate the damaged parts are replaced or repaired.

The second bearing is ideally arranged radially outside the first bearing. That is to say, the main bearing is arranged as known per se on the shaft of the pulley and is mounted in the bearing frame via the emergency running bearing which is arranged radially outside.

In the case of torque-loaded shafts, such as those of pulleys, it also has to be ensured in the case of a shaft fracture that the pulley does not tilt, in other words is held or mounted in the correct position in a stable manner.

In order to solve this problem, it is proposed according to the invention that a hub of the pulley is mounted in the bearing frame via second emergency running bearings.

If the inner ring of the second emergency running bearings is arranged with play on the hub here, said second emergency running bearings are at a standstill during normal operation and are completely unloaded, with the result that they have to be designed only for holding the pulley in its position in the case of a shaft fracture and ensuring further rotation of the pulley until all passengers have been evacuated and possibly all carriers have also been withdrawn.

Further preferred embodiments of the invention are the subject matter of the remaining subclaims.

Further features and advantages of the invention result from the following description of one preferred exemplary embodiment of the invention with reference to the appended drawings, in which:

BRIEF DESCRIPTION OF THE SEVERAL VIEWS OF THE DRAWING

FIG. 3 shows a further detail from FIG. 1.

DESCRIPTION OF THE INVENTION

Figure 1:
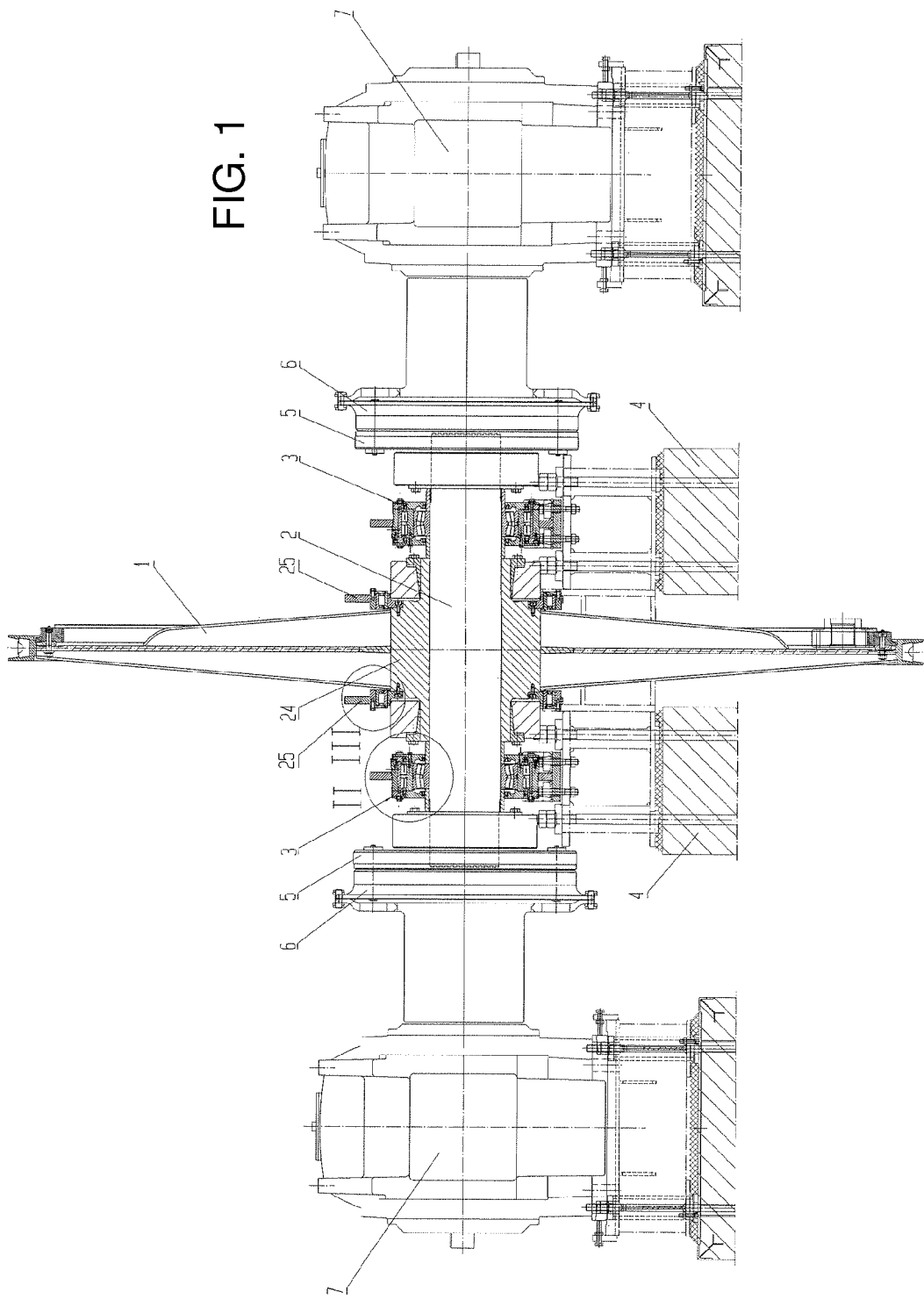
FIG. 1 shows the entire bearing and drive arrangement of a pulley of a cable car.
Figure 2:
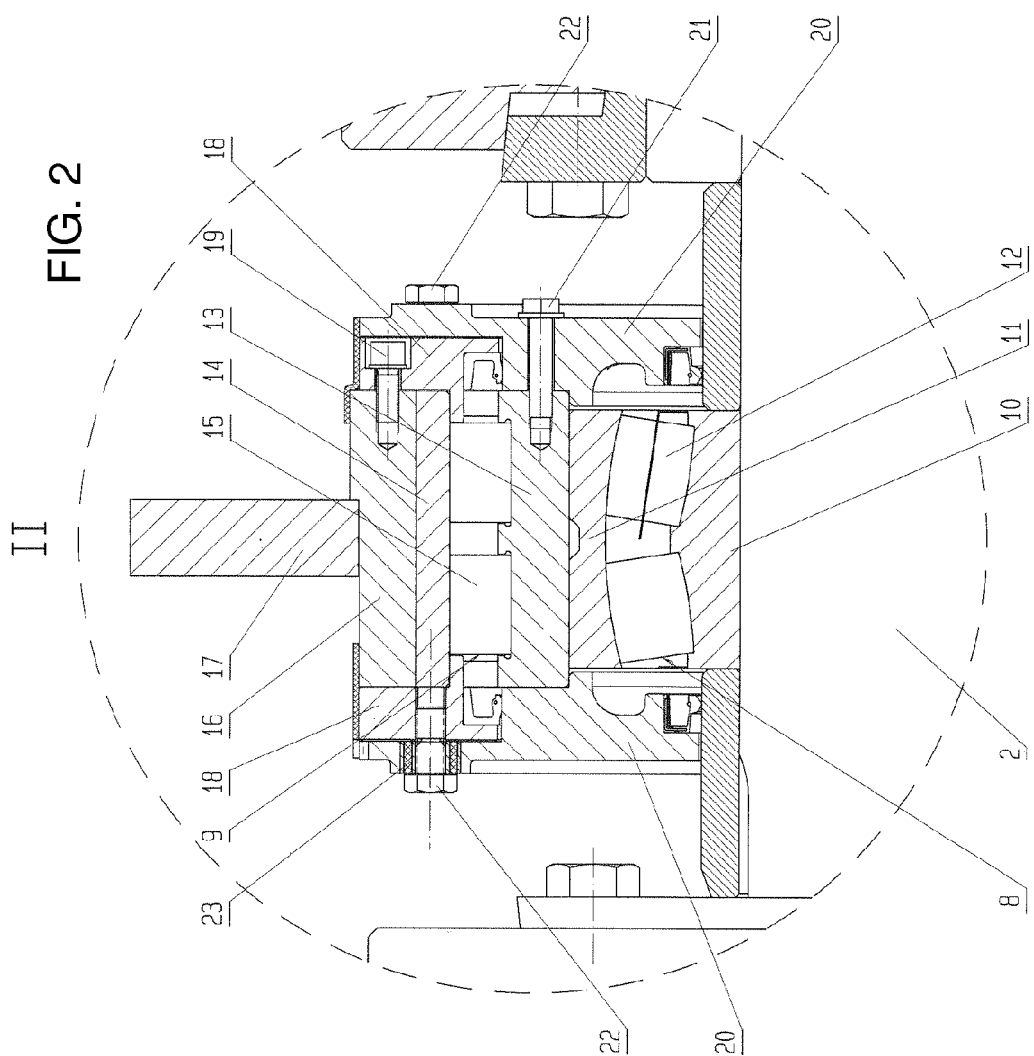
FIG. 2 shows a detail from FIG. 1.

FIG. 1 shows a bearing and drive arrangement of a pulley 1 of a cable car, which pulley 1 is mounted in a bearing frame 4 via a shaft 2 and two bearing units 3. The shaft 2 is connected via flanges 5, 6 to two drives 7 which can be either electric or hydraulic drives. It goes without saying, however, that there could also be only a single drive 7.

Each bearing unit 3 has a first main bearing 8 which is designed for normal operation and a second emergency running bearing 9 which is designed for emergency operation. The main bearing 8 which can be a locating bearing or a floating bearing has, in a manner known per se, an inner ring 10 which is fastened to the shaft 2 and an outer ring 11, between which rings rolling bodies 12 rotate. In the embodiment which is shown, the emergency running bearing 9 is likewise an anti-friction bearing having an inner ring 13, an outer ring 14 and rolling bodies 15.

The inner ring 13 of the emergency running bearing 9 is connected to the outer ring 11 of the main bearing 8, that is to say the radial forces which act on the bearings are transmitted. However, the inner ring 13 and the outer ring 11 can be displaced in the axial direction and possibly in the circumferential direction. The outer ring 14 of the emergency running bearing 9 is connected to a supporting ring 16 which is fastened in a supporting plate 17 of the bearing frame 4. The connection of the inner ring 13 of the emergency running bearing 9 to the outer ring 11 of the main bearing 8 can be, for example, a press fit, but can likewise also be a sliding fit.

Two annular disk-shaped centering bearing caps 18 are fastened laterally to the supporting ring 16 by way of screws 19, which centering bearing caps 18 serve to center the emergency running bearing axially and also to seal it. Furthermore, bearing caps 20 which also assume the sealing function of the bearings 8, 9 are fastened to the inner ring 13 of the emergency running bearing 9 by way of screws 21. The centering bearing caps 18 and the bearing caps 20 are connected to one another via in each case at least one screw 22 with a predetermined break point, a shear pin or the like.

The inner ring 13 and the outer ring 14 of the emergency running bearing 9 are therefore connected fixedly to one another so as to rotate together via the centering bearing caps 18, the bearing caps 20 and the supporting ring, with the result that only the two main bearings 8 rotate in normal operation. Should the main bearing be destroyed for some reason or be damaged to such an extent that it no longer rotates, the screws 22 are sheared off, as a result of which the inner ring 13 and the outer ring 14 of the emergency running bearing 9 can rotate with respect to one another and, as a further consequence, the emergency running bearing 9 assumes the bearing function of the shaft 2 in the bearing frame 4. In order to ensure controlled and reliable shearing of the screws 22 or the like, they are mounted via elastic bushes 23 in the bearing caps 20.

The bearing caps 20 are preferably dimensioned in such a way that they can support the entire bearing force of the respective bearing unit 3. This has the advantage that a bearing unit 3 also remains functional via the bearing caps 20 and the emergency running bearing 9 even when a main bearing 8 collapses completely or has too much play as a result of excessive wear.

Depending on the dimensions of the emergency running bearing 9, either only emergency operation for evacuating the passengers or relatively long operation can be made possible in this way.

Instead of an outer ring 14 for the emergency running bearing, the supporting ring 16 can also assume the function thereof, which simplifies the construction of the emergency running bearing 9.

An intermediate ring can be arranged between the inner ring 13 of the emergency running bearing 9 and the outer ring 11 of the main bearing 8. Said intermediate ring can be a cylindrical sleeve in the simplest case. However, the intermediate ring could also replace the inner ring 14 of the emergency running bearing 9. Moreover, the intermediate ring can be used, in order to offset the emergency running bearing 9 in the axial and/or radial direction with respect to the main bearing 8, for which purpose the intermediate ring can have a substantially cylindrical shape or a diameter which is recessed in an approximately Z-shaped manner in cross section. In the latter case, the emergency running bearing 9 and the main bearing 8 can be arranged in the axial direction substantially or at least partially next to one another, possibly with different bearing diameters.

A further pair of emergency running bearings 25 can be seen in detail in FIG. 3, which pair serves as pulley catching apparatus, in order to mount the pulley 1 if the shaft 2 fractures or some other damage occurs which would endanger the correct mounting of the pulley 1.

The second emergency running bearings 25 are likewise mounted via supporting plates 26 in the bearing frame 4, the outer ring 27 of the emergency running bearing 25 being fastened in a supporting ring 28 on the supporting plate 26. Instead of an outer ring 27 for the emergency running bearing 25, the supporting ring 28 can also assume the function thereof, which simplifies the construction of the emergency running bearing 25. The inner ring 29 of the emergency running bearing 25 is arranged with a small play or gap 30 on a bearing ring 31 on the hub 24 of the pulley 1.

Since the inner ring 29 of the emergency running bearing 25 does not bear against the bearing ring 31, the inner ring 29 does not rotate together with the pulley 1. Should, however, the pulley 1 tilt, for example as a result of a fracture of the shaft 2, said pulley 1 is supported by the emergency running bearings 25 and can still rotate further at least for a certain time.

The invention is not restricted to anti-friction bearings, but rather can also be used in plain bearings. A combination of plain and anti-friction bearings is likewise possible. It would also be possible to arrange the emergency running bearing 9 within the main bearing 8. Moreover, the inner ring 13 and the outer ring 14 of the emergency running bearing 9 could be connected directly to one another via a connection with a predetermined break point.

The invention claimed is:

1. A bearing unit of a pulley of a cable car wherein the pulley is mounted on a shaft, the bearing unit comprising:
bearings to be mounted in a bearing frame and supporting the shaft, said bearings including at least one first bearing and at least one second bearing;
said first bearing having an inner ring and an outer ring, said inner ring being connected to the shaft; and
said second bearing having an inner ring and an outer ring, said outer ring of said first bearing is connected to said inner ring of said second bearing and is mounted in the bearing frame via said second bearing, said inner ring and said outer ring of said second bearing which is configured for emergency operation being connected fixedly to one another so as to rotate together, a connection between said inner ring and said outer ring of said second bearing having a predetermined break point;
at least one supporting device; and
said second bearing being disposed radially outside said first bearing and optionally offset axially with respect to said first bearing, and in that, in a case of a defect of said first bearing, said inner ring of said second bearing or an intermediate ring connecting said first bearing to said second bearing being supported on the shaft via said at least one supporting device.

2. The bearing unit according to claim 1, wherein said first bearing is a bearing which is configured for normal operation and said second bearing is a bearing which is configured for emergency operation.

3. The bearing unit according to claim 2, wherein said inner ring and said outer ring of said second bearing which is configured for emergency operation are connected fixedly to the bearing frame so as to rotate with the bearing frame.

4. The bearing unit according to claim 3, wherein said inner ring of said second bearing which is configured for emergency operation is connected via a predetermined break point fixedly to the bearing frame so as to rotate with the bearing frame.

5. The bearing unit according to claim 1, wherein the predetermined break point is formed by at least one fastener selected from the group consisting of screws and shear pins.

6. The bearing unit according to claim 5, wherein said fastener connects said supporting device and said outer ring of said second bearing to one another.

7. The bearing unit according to claim 5,
further comprising a centering bearing cap connected to the bearing frame; and
wherein said fastener connects said supporting device and said centering bearing cap to one another.

8. The bearing unit according to claim 7, further comprising elastic bushes mounted in said supporting device, said fastener is mounted in said elastic bushes.

9. The bearing unit according to claim 1, further comprising emergency running bearings, a hub of the pulley is mounted in the bearing frame via said emergency running bearings.

10. The bearing unit according to claim 9, wherein said emergency running bearings each have an inner ring disposed with play on the hub.

11. The bearing unit according to claim 1, wherein said first bearing, said second bearing and/or said emergency running bearings are plain bearings or anti-friction bearings.

12. A bearing unit of a pulley of a cable car wherein the pulley is mounted on a shaft, the bearing unit comprising:
bearings to be mounted in a bearing frame and supporting the shaft, said bearings including at least one first bearing and at least one second bearing;
said first bearing having an inner ring and an outer ring, said inner ring being connected to the shaft; and said second bearing having an inner ring and an outer ring, said outer ring of said first bearing is connected to said inner ring of said second bearing and is mounted in the bearing frame via said second bearing;

at least one supporting device; and said second bearing being disposed radially outside said first bearing and optionally offset axially with respect to said first bearing, and in that, in a case of a defect of said first bearing, said inner ring of said second bearing or an intermediate ring connecting said first bearing to said second bearing being supported on the shaft via said at least one supporting device.

13. The bearing unit according to claim 12, wherein said supporting device is a bearing cap.

14. A drive configuration of a cable car, the drive configuration comprising:

a shaft;

a pulley mounted on said shaft;

a bearing frame; and bearing units, each of said bearing units containing:

bearings mounted in said bearing frame and supporting said shaft, said bearings including at least one first bearing and at least one second bearing;

said first bearing having an inner ring and an outer ring, said inner ring being connected to the shaft; and said second bearing having an inner ring and an outer ring, said outer ring of said first bearing is connected to said inner ring of said second bearing and is mounted in the bearing frame via said second bearing, said inner ring and said outer ring of said second bearing which is configured for emergency operation being connected fixedly to one another so as to rotate together, a connection between said inner ring and said outer ring of said second bearing having a predetermined break point;

at least one supporting device; and said second bearing being disposed radially outside said first bearing and optionally offset axially with respect to said first bearing, and in that, in a case of a defect of said first bearing, said inner ring of said second bearing or an intermediate ring connecting said first bearing to said second bearing being supported on the shaft via said at least one supporting device.

15. The bearing unit according to claim 14, further comprising emergency running bearings; and wherein said pulley has a hub mounted in said bearing frame via said emergency running bearings.

16. The bearing unit according to claim 14, wherein said emergency running bearings each have an inner ring disposed with play on said hub.

* * * * *